(12) United States Patent
Nasser et al.

(10) Patent No.: US 8,488,416 B2
(45) Date of Patent: Jul. 16, 2013

(54) EARTHQUAKE DETECTION AND ALARMING APPARATUS

(76) Inventors: Habib Jeries Nasser, Kfar Smeia (IL); Meir Gitelis, Tel-Aviv (IL)

( * ) Notice: Subject to any disclaimer, the term of this patent is extended or adjusted under 35 U.S.C. 154(b) by 352 days.

(21) Appl. No.: 12/936,428

(22) PCT Filed: Apr. 5, 2009

(86) PCT No.: PCT/IL2009/000370
§ 371 (c)(1),
(2), (4) Date: Oct. 5, 2010

(87) PCT Pub. No.: WO2009/125391
PCT Pub. Date: Oct. 15, 2009

(65) Prior Publication Data
US 2011/0041615 A1 Feb. 24, 2011

Related U.S. Application Data

(60) Provisional application No. 61/042,768, filed on Apr. 7, 2008.

(51) Int. Cl.
*G01V 1/18* (2006.01)
(52) U.S. Cl.
USPC .......... 367/178; 340/690; 33/1 HH; 346/33 C
(58) Field of Classification Search
USPC .... 33/366.14, 366.16, 266.23, 1 HH; 73/595, 73/643, 649, 654, 655, 657; 181/122; 200/61.45 R, 61.47, 61.52; 250/231.1, 577; 324/323, 324/324; 340/540, 566, 601, 669, 690; 367/185, 367/188, 178; 702/14; 346/33 C
See application file for complete search history.

(56) References Cited

U.S. PATENT DOCUMENTS

| | | | |
|---|---|---|---|
| 4,083,255 A | | 4/1978 | McKechnie |
| 4,556,799 A | * | 12/1985 | Rolando ........................ 250/577 |
| 4,662,225 A | | 5/1987 | Koh et al. |
| D350,903 S | | 9/1994 | Chem |
| 5,625,348 A | * | 4/1997 | Farnsworth et al. .......... 340/690 |
| 6,114,967 A | | 9/2000 | Yousif |
| 2002/0162235 A1 | * | 11/2002 | Rando ......................... 33/366.16 |
| 2007/0051178 A1 | | 3/2007 | Chien |

* cited by examiner

*Primary Examiner* — Isam Alsomiri
*Assistant Examiner* — Daniel L Murphy
(74) *Attorney, Agent, or Firm* — Daniel J. Swirsky; AlphaPatent Associates Ltd.

(57) ABSTRACT

In one aspect, the present invention is directed to an earthquake detection and alarming apparatus, comprising: a transparent object (46) having a concave surface on the top thereof; a rollable object (34) placed on the concave surface; an apiary of light projectors (30) placed above the concave surface; an apiary of light receivers (38) correspondingly to the apiary of light projectors, the apiary of light receivers being placed below the concave surface; and circuitry for determining: (a) vibrating frequency and amplitude of the rollable object with reference to the concave surface from sensing of the receivers (38); and (b) deducing therefrom the arrival of primary waves.

15 Claims, 5 Drawing Sheets

EARTHQUAKE DETECTION AND ALARMING APPARATUS

CROSS-REFERENCE TO RELATED APPLICATIONS

The current application is a U.S. National Phase Application under 35 U.S.C. 371 of PCT International Application No. PCT/IL2009/000370, which has an international filing date of Apr. 5, 2009, and which claims the benefit of priority from U.S. Provisional Patent Application No. 61/042768, filed Apr. 7, 2008, whose disclosure is incorporated herein by reference.

FIELD OF THE INVENTION

The present invention relates to the field of earthquake detectors and alarms.

BACKGROUND OF THE INVENTION

Various types of earthquake sensors are known in the patent literature. The following U.S. Patents are believed to represent the state of the art: U.S. Pat. Nos. 4,086,807; 4,262,289; 4,297,690; 4,358,757; 4,484,186; 4,662,225; 4,689,997; 4,764,761; 4,764,762; 4,789,922; 4,841,288; 4,904,943; 4,945,347; 4,978,948; 4,980,644; 5,001,466; 5,101,195; 5,248,959; 5,278,540, 5,539,387.

The present invention seeks to overcome the disadvantages of the prior art attempts and provides a relatively inexpensive and reliable earthquake sensor and alarm therefor.

Other objects and advantages of the invention will become apparent as the description proceeds.

SUMMARY OF THE INVENTION

In one aspect, the present invention is directed to an earthquake detection and alarming apparatus, comprising:
- a transparent object (46) having a concave surface on the top thereof;
- a rollable object (34) placed on the concave surface;
- an apiary of light projectors (30) placed above the concave surface;
- an apiary of light receivers (38) correspondingly to the apiary of light projectors, the apiary of light receivers being placed below the concave surface; and
- circuitry for determining (a) vibrating frequency and amplitude of the rollable object with reference to the concave surface from sensing of the receivers (38), and (b) deducing therefrom arrival of primary waves.

According to one embodiment of the invention, determining the vibrating frequency of the rollable object is deduced from input of the receiver of the apiary that corresponds to the lowest point (54) of the concave surface.

According to one embodiment of the invention, determining the vibrating amplitude of the rollable object is deduced from the larger distance between each of two receivers that indicate vibrations.

The apparatus may further comprise an alerting system comprising visual and/or audio alarm.

According to one embodiment of the invention, the visual alarm comprises a plurality of lamps (6), for indicating the intensity of an earthquake.

The circuitry may further corresponds detected secondary waves to Mercalli Scale.

Preferably, the concave surface is enclosed within a sealed space (48), thereby preventing dust entry into the space, thereby prolonging the time to next maintenance of the apparatus.

Preferably, the casing (42) of the apparatus is in the form of a domestic appliance (e.g., a clock), thereby diminishing the frightening connotation associated with the apparatus.

According to one embodiment of the invention, the projectors (30) are based on LEDs, thereby adapting the apparatus to use a negligible power supply.

According to one embodiment of the invention, the receivers (38) are based on LED (diodes).

According to one embodiment of the invention, the rollable object is a mercury drop.

According to another embodiment of the invention, the rollable object is a non-transparent sphere.

The apparatus may further comprise one or more bolts, for securing the apparatus to a wall.

In another aspect, the present invention is directed to a method for detecting primary waves of an earthquake, the method comprising the steps of:
- providing sensors for detecting the location of a rollable object on a concave surface;
- deducing the frequency and amplitude of cyclical movement of the rolling object with reference to the concave surface; and
- determining primary waves on earthquake by detecting an association of the frequency and amplitude with known frequency and amplitude that characterizes primary waves of an earthquake.

The foregoing embodiments of the invention are described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

Figure 1:
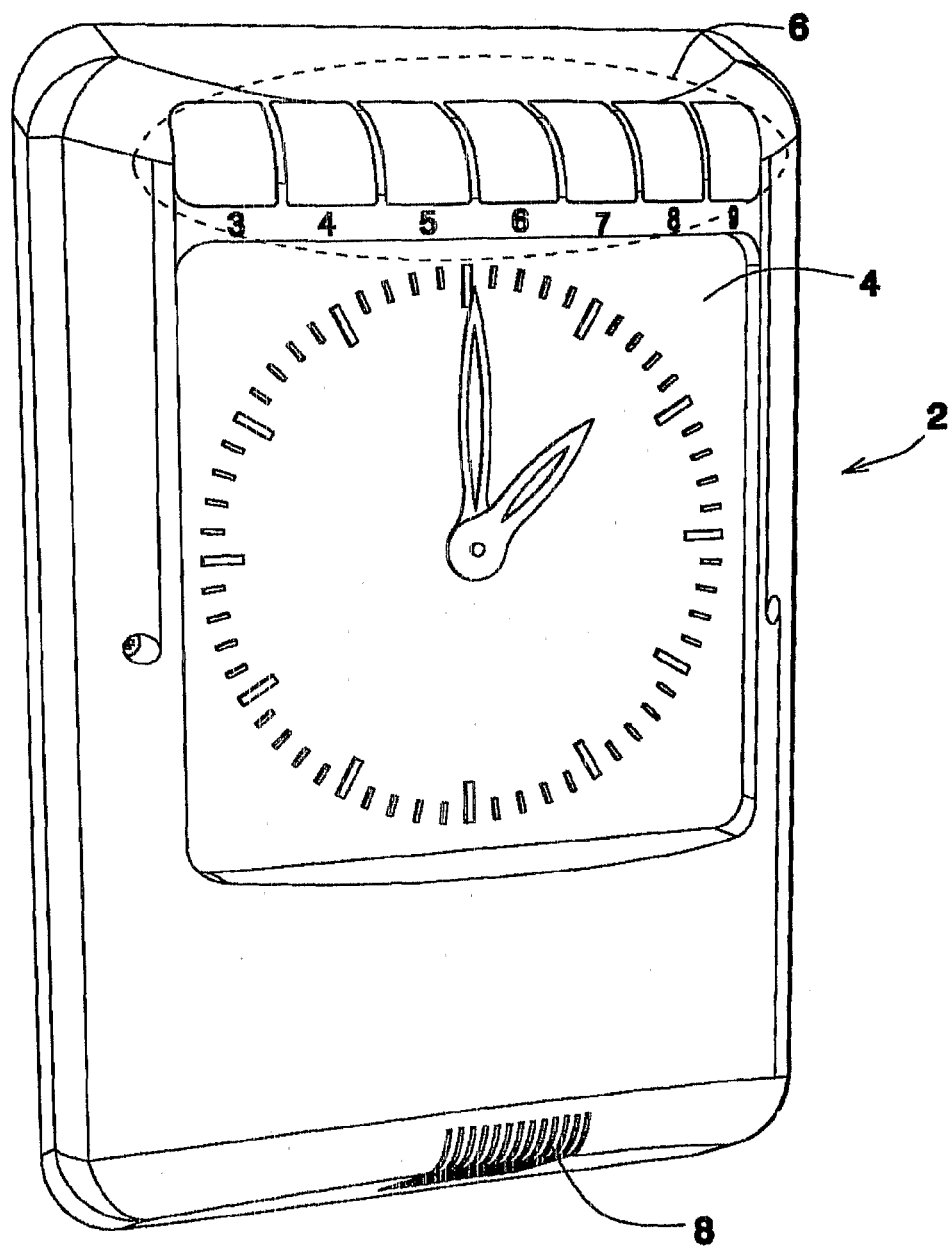
FIG. 1 schematically illustrates an earthquake detection and alarming apparatus, according to one embodiment of the invention.

FIG. 1 schematically illustrates an earthquake detection and alarming apparatus, according to one embodiment of the invention.

The apparatus, which is marked herein by reference numeral 2, comprises a casing 42 on which are disposed indication lamps 6, for indicating the intensity of an earthquake, and a clock 4. Thus, the apparatus consolidates a clock with earthquake indicators in a single device. The clock diminishes the frightening connotation of an earthquake alerting apparatus.

Preferably, indication lamps 6 are embodied as LEDs (Light Emitting Diode), as they provide adequate light intensity to be observed in domestic surroundings, along with negligible power consumption.

In order to provide indication about the intensity of the earthquake, each of indication lamps 6 is marked by a digit. The higher the digit, the higher the earthquake intensity.

Additionally or alternatively, the sensed intensity may be marked by intensity of the illuminating LED, a color, and so on. For example, the colors of the indication lamps may vary from yellow to red.

According to one embodiment of the invention, the scale of the indication lamps corresponds to the New Mercalli Scale.

The Mercalli Intensity Scale is a scale developed as a way of measuring the actual effects or intensity of an earthquake at a particular location, and is expressed in roman numerals from I the weakest to XII the strongest.

The actual intensity of an earthquake depends on the distance from the epicenter and local geological conditions. While Richter scale measures the magnitude of an earthquake independent of location, Mercalli indicates the earthquake intensity at the measured location.

The scale quantifies the effects of an earthquake on the Earth's surface, humans, nature, and man-made structures. Intensity I denotes a weak earthquake, and XII denotes an intensity causing almost complete destruction.

As the first "meaningful" intensity of Mercalli Scale is III, in the embodiment illustrated herein, the first degree is 3. Intensity 9 stands for intensity IX of Mercalli, and higher.

Figure 2:
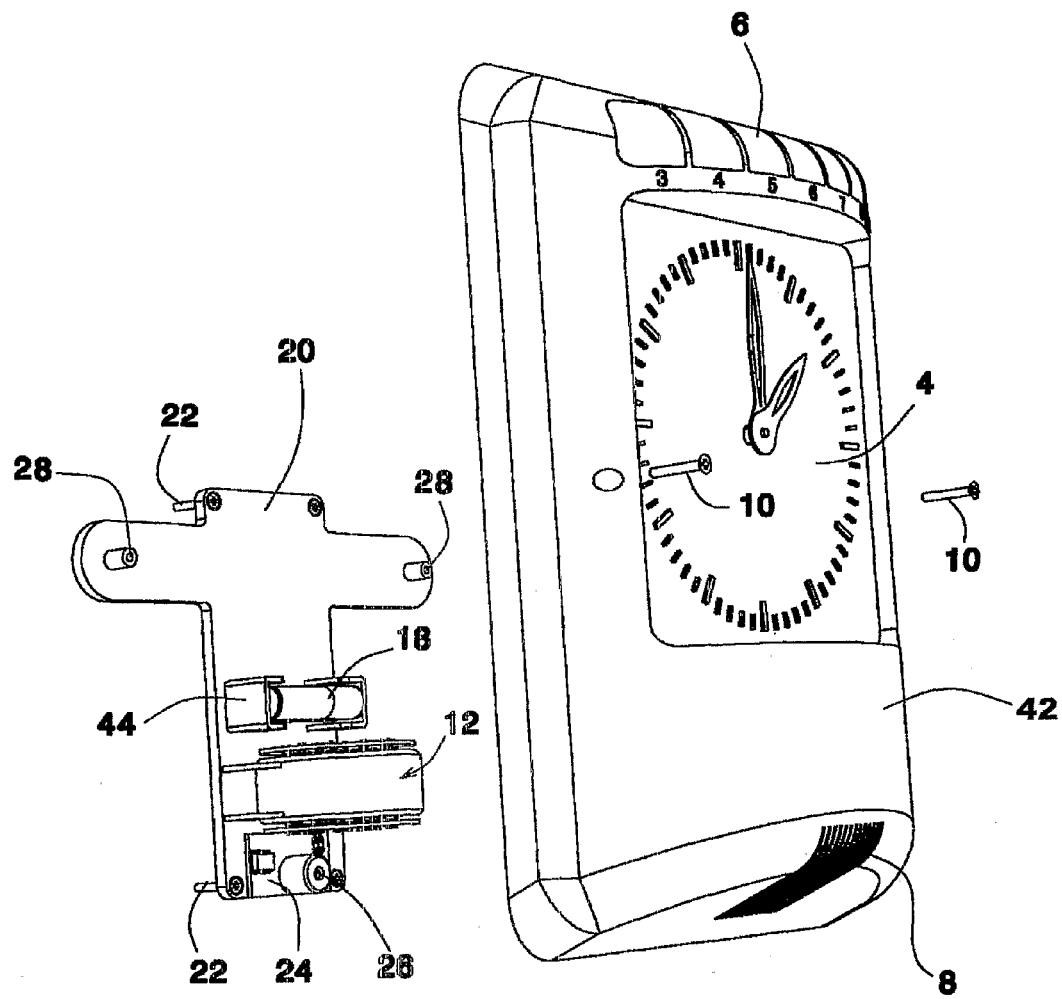
FIG. 2 schematically illustrates the apparatus of FIG. 1 in a disassembled mode.

FIG. 2 schematically illustrates the apparatus of FIG. 1 in a disassembled mode.

Reference numeral 20 denotes the base (chassis) on which the parts of earthquake detection and alarming mechanism are mounted.

Reference numeral 18 denotes a battery that supplies power to the apparatus, and reference numeral 44 denotes the housing thereof.

Reference numeral 12 denotes an earthquake detector (sensor), numeral 24 denotes a control circuit of the alarm of the apparatus, and numeral 26 denotes a speaker thereof. Chassis 20 is secured to a wall by bolts 22.

Casing 42 is secured to chassis 20 by bolts 10 and corresponding threads 28 on the chassis. Thus, in order to separate casing 42 from chassis 20, for example, for replacing batteries 18, one has to unscrew bolts 10.

Figure 3:
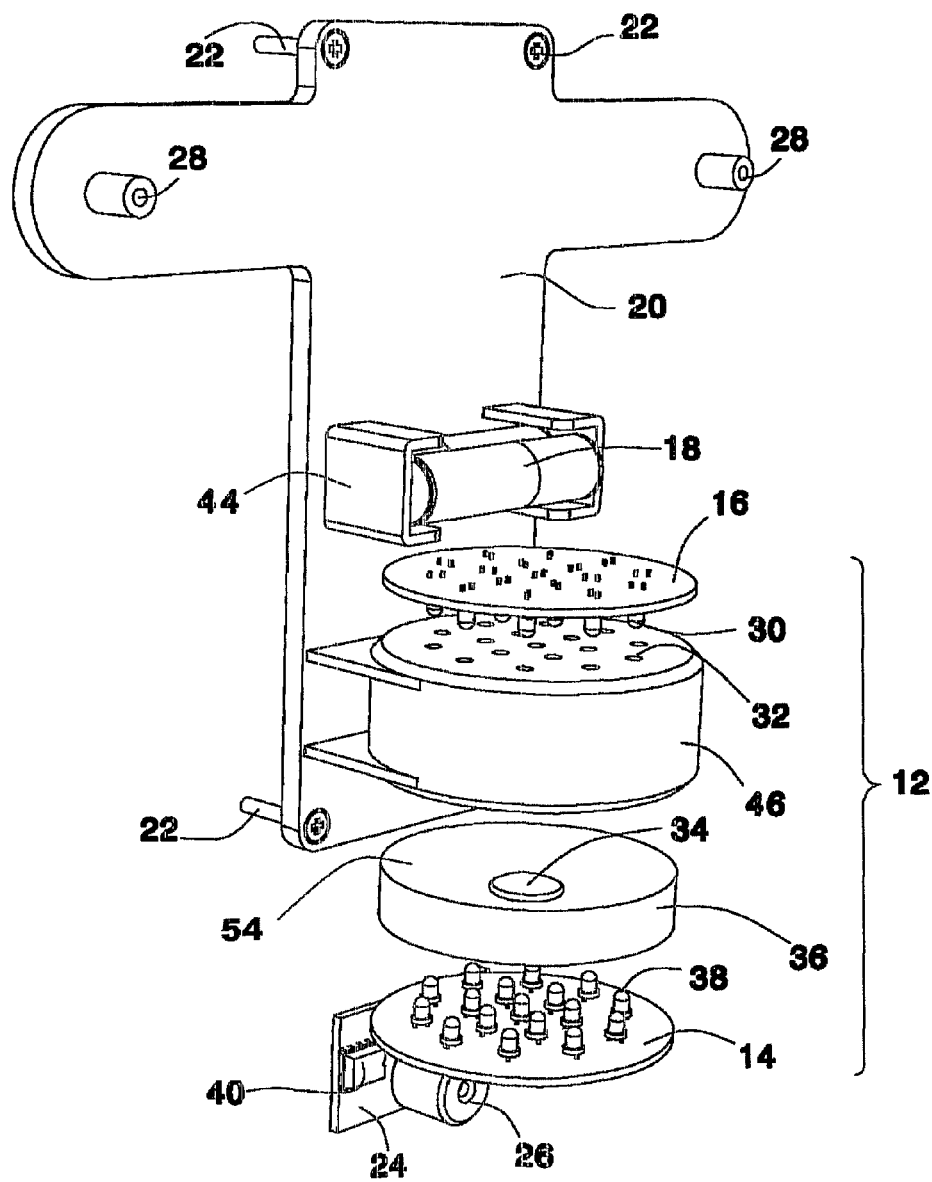
FIG. 3 is an exploded view of the sensing and alerting units of the apparatus of FIG. 1, which illustrates the structure of sensor 12.

FIG. 3 is an exploded view of the sensing and alerting units of the apparatus of FIG. 1, which illustrates the structure of sensor 12.

A mercury drop 34 is placed on a transparent plate 36, which has a substantially concave surface 54. The concave surface is placed between an "apiary" of projectors 30, and a corresponding apiary of receivers (sensors). Thus, mercury drop 34, which is non-transparent, blocks light projected by some of projectors 30.

A projector 30 may be based on a LED, as its electrical power consumption is relatively low, and as a result, it can operate using battery power instead of domestic power supply.

A receiver 38 may also be based on a LED, which is a diode. This subject is well known in the art, and for the sake of brevity is not detailed herein.

Figure 4:
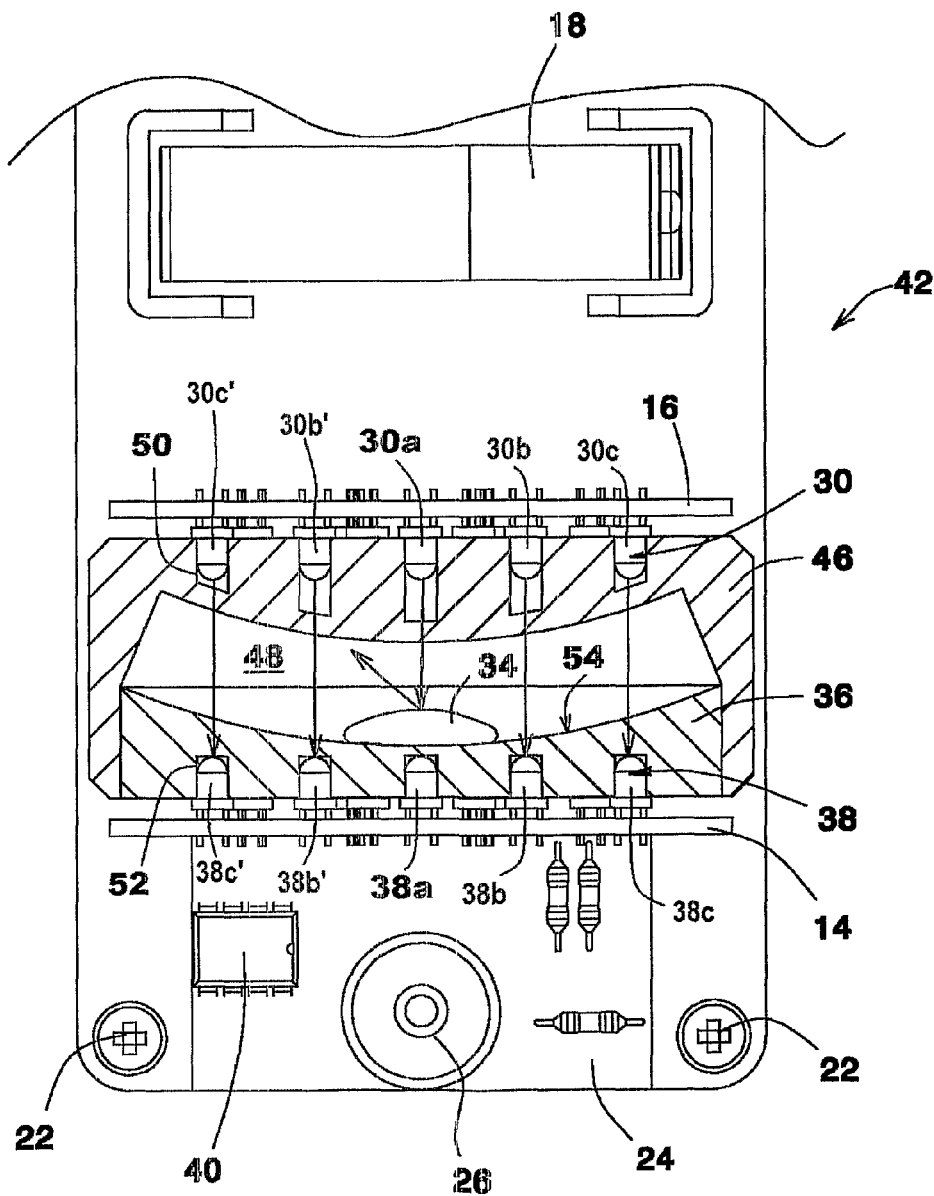
FIG. 4 schematically illustrates the apparatus of FIG. 1 in a non-earthquake situation.
Figure 5:
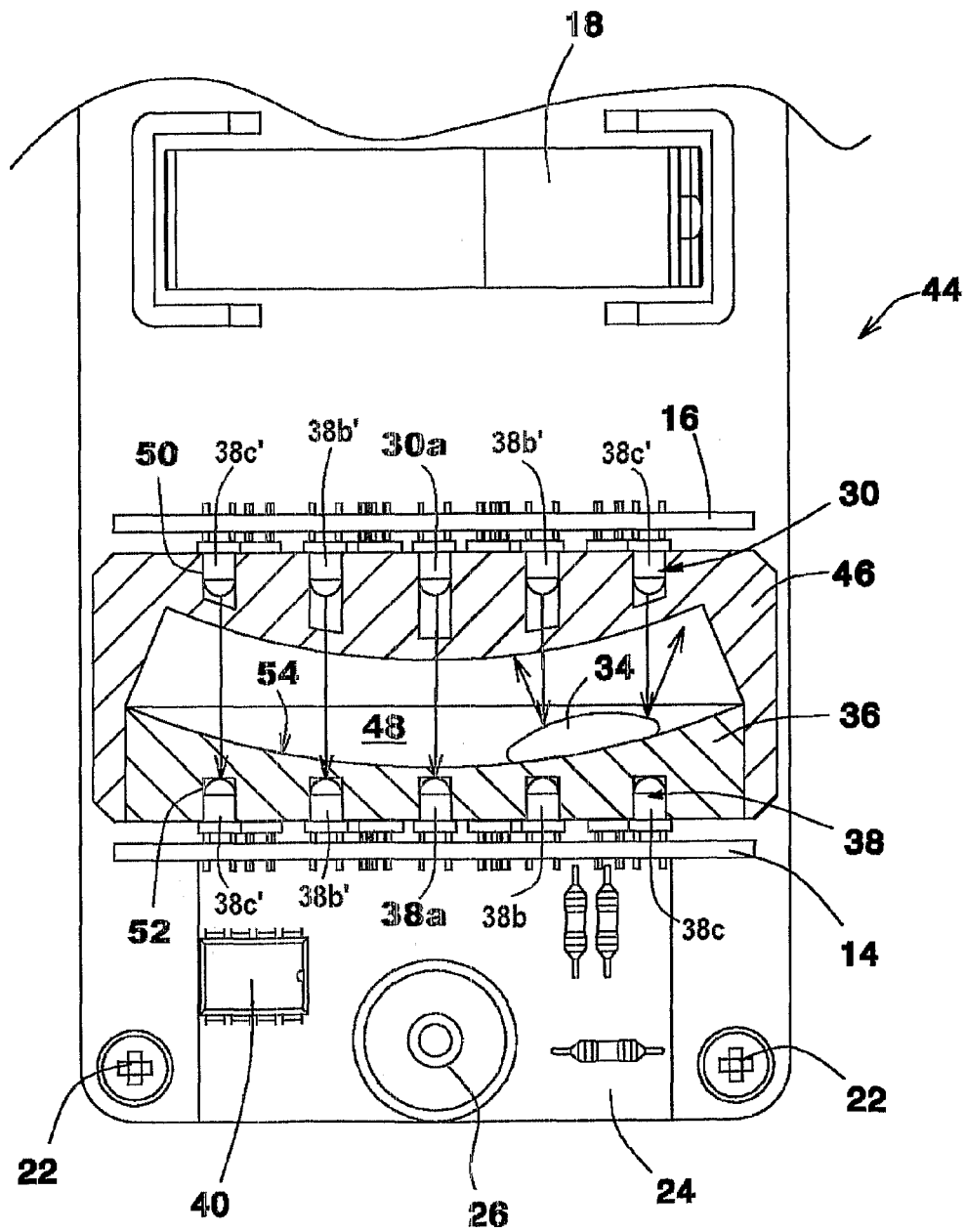
FIG. 5 schematically illustrates the apparatus of FIG. 1 in an earthquake situation.

FIG. 4 schematically illustrates the apparatus of FIG. 1 in a non-earthquake situation, and FIG. 5 schematically illustrates the apparatus of FIG. 1 in an earthquake situation.

In FIGS. 4 and 5, element 46 is cross-sectioned. Element 46 is a transparent cover of plate 36.

In FIG. 4, which illustrates the situation of mercury drop 34 in a non-earthquake situation, mercury drop 34 blocks the beam projected by projector 30a and received by receiver 38a.

In FIG. 5, which illustrates the situation of mercury drop 34 in an earthquake situation, mercury drop 34 blocks the beam projected by projectors 30b and 30c, and received by receivers 38n and 38c, respectively.

In FIGS. 4 and 5, it is assumed that the receiver 38a is placed under the lowest point of concave surface 54; however, if apparatus 2 is mounted inclined, the other receiver will be under the lowest point of surface 54.

Detecting an Earthquake

As known to the skilled person in the art, an earthquake can be detected by identifying the arrival of primary (P) waves, that precede arrival of more destructive shear (S) and rally (R) waves (secondary waves). As the P waves travel 1.68 times faster than the S waves, the greater the distance from the epicenter of an earthquake one is, the greater would be the time elapsed between the P and S waves.

By identifying the P waves, an alert of tens of seconds may be provided (depending on the distance from the epicenter and the depth of the focus). This time can be used to take precautionary actions such as finding shelter, leaving a building, or stopping an elevator at the next floor, in the event of an upcoming seismic shaking.

P waves are characterized by, for example, their frequency and amplitude, which differ, for example, from vibrations caused by passing traffic.

The state of a receiver can be defined as the yes/no indication thereof, i.e., is the light beam projected from the corresponding projector received by the receiver or not. "Received" in this case means that the light intensity indicated by the receiver is higher than a certain threshold. Actually, while the wall to which apparatus 2 is secured vibrates, the absolute location of the mercury drop is steadier; however, from the viewpoint of receivers 38, the vibrating element is mercury drop 34.

Assuming that in a non-earthquake situation mercury drop 34 blocks projector 30a (i.e., the apparatus stands substantially vertically), in an earthquake situation, receiver 38a senses the frequency of the vibrations, and the rest of the receivers sense the amplitude of the vibrations. For example, in the case receivers 38c, 38b, 38a, 38b' and 38c' indicate vibrations, the amplitude is greater than in the case wherein receivers 38b, 38a, and 38b' indicate vibrations, as the physical distance between receivers 38c and 38c' is greater than the distance between receivers 38v and 38b'.

The greatest distance between two receivers that indicate vibrations can be detected by processor 40, which can calculate the distance between each of two receivers that detect vibrations.

According to one embodiment of the invention, a non-transparent sphere replaces the mercury drop.

Receivers 38 detect only an on/off state. In order to obtain the frequency and amplitude from the on/off states of the receivers, a circuitry is required. The circuitry/electronic chip is marked herein by reference numeral 40.

It should be noted that apparatus 2 has to be placed substantially vertically, i.e., may be slightly inclined. As such, it suits to be used in a domestic place, as domestic users prefer an easy installation.

In one embodiment of the invention, apparatus 2 comprises a setup button, for informing the internal mechanism of the apparatus that the current state is the non-earthquake state.

The intensity of an earthquake can be determined from the distance the mercury has shifted, from the shifting speed, a combination of this information, and so on. The analysis is carried out by an electronic chip 40.

Numeral 46 denotes a transparent cover, corresponding to transparent plate 36. Cylindrical housing 50 of a projector 30 in element 46, and cylindrical housing 52 of a receiver 38 in plate 36 are non-transparent, thereby the projected beams from a projector to a receiver does not spread. This way, the majority of the beam from a projector reaches to the corresponding receiver thereof.

Furthermore, if space 48 enclosed between cover 46 and plate 36 is kept sealed, it prevents dust entry into space 48, thereby prolonging the time apparatus 2 may operate without maintenance.

In the figures and/or description herein, the following reference numerals have been mentioned:
- numeral 2 denotes an earthquake detection and alarming apparatus, according to one embodiment of the invention;
- numeral 4 denotes a clock;
- numeral 6 denotes indication lamps, for indicating the intensity of an earthquake;
- numeral 8 denotes an opening in the casing of the apparatus, for speaker 26 that plays an audio alarm;
- numeral 10 denotes bolts;
- numeral 12 denotes an earthquake detector;
- numeral 14 denotes a platform on which is disposed a matrix of receivers 38;
- numeral 16 denotes a platform on which is disposed a matrix of projectors 30;
- numeral 18 denotes a battery;
- numeral 20 denotes the base (chassis) on which the parts of earthquake detection and alarming mechanism are mounted;
- numeral 22 denotes a bolt for securing chassis 20 to a wall;
- numeral 24 denotes a control circuit of an alarm of the apparatus;
- numeral 26 denotes a speaker of the alarm;
- numeral 28 denotes a thread on chassis 20, correspondingly to bolt 10;
- numeral 30 denotes a projector;
- numeral 32 denotes bores restricting the course of a light beam projected by a projector 30;
- numeral 34 denotes a mercury drop;
- numeral 36 denotes a transparent plate having concave surface, on which drop 34 is placed;
- numeral 38 denotes a receiver (sensor);
- numeral 40 denotes an electronic chip/circuitry, which performs relevant calculations, such as the frequency and amplitude of sensed vibrations, deducting the intensity of an earthquake from these vibrations, and so on;
- numeral 42 denotes, the casing of apparatus 2;
- numeral 44 denotes a housing of batteries 18;
- numeral 46 denotes a transparent cover to plate 36;
- numeral 48 denotes the space enclosed between plate 36 and the cover thereof 46;
- numeral 50 denotes a housing of a projector;
- numeral 52 denotes a housing of a receiver; and
- numeral 54 denotes a concave surface.

The foregoing description and illustrations of the embodiments of the invention has been presented for the purposes of illustration. It is not intended to be exhaustive or to limit the invention to the above description in any form.

Any term of the claims that has been defined above, has to be interpreted according to this definition.

What is claimed is:

1. An earthquake detection and alarming apparatus, comprising:
   - a transparent object having a concave surface on the top thereof;
   - an apiary of light projectors placed above said concave surface;
   - an apiary of light receivers correspondingly to said apiary of light projectors, said apiary of light receivers being placed below said concave surface;
   - a non-transparent rollable object displaceable along said concave surface for blocking a portion of light projected from said light projectors unto said light receivers; and
   - circuitry for determining: (a) vibrating frequency and amplitude of said rollable object responsive to a position and a displacement on said concave surface; and (b) deducing therefrom the arrival of primary waves;
   - wherein said position and said displacement are determined responsive to said light receivers detecting unblocked light projected from corresponding light projectors.

2. An apparatus according to claim 1, wherein determining the vibrating frequency of said rollable object is deduced from input of the receiver of said apiary which corresponds to the lowest point of said concave surface.

3. An apparatus according to claim 1, wherein determining the vibrating amplitude of said rollable object is deduced from the larger distance between each of two receivers that indicate vibrations.

4. An apparatus according to claim 1, further comprising an alerting system comprising visual and/or audio alarm.

5. An apparatus according to claim 4, wherein said visual alarm comprises a plurality of lamps, for indicating the intensity of an earthquake.

6. An apparatus according to claim 1, wherein said circuitry further corresponds detected secondary waves to the Mercalli Scale.

7. An apparatus according to claim 1, wherein said concave surface is enclosed within a sealed space, thereby preventing dust entry into said space, thereby prolonging the time of next maintenance of said apparatus.

8. An apparatus according to claim 1, wherein the casing thereof is in the form of a domestic appliance, thereby diminishing the frightening connotation associated with said apparatus.

9. An apparatus according to claim 8, wherein said domestic appliance is a wall clock.

10. An apparatus according to claim 1, wherein each of said projectors is based on LED, thereby adapting said apparatus to use a negligible power supply.

11. An apparatus according to claim 1, wherein each of said receivers is based on LED.

12. An apparatus according to claim 1, wherein said rollable object is a mercury drop.

13. An apparatus according to claim 1, wherein said rollable object is a non-transparent sphere.

14. An apparatus according to claim 1, further comprising one or more bolts, for securing said apparatus to a wall.

15. A method for detecting primary waves of an earthquake, the method comprising the steps of:
   - illuminating a concave surface from above;

sensing said illuminating on an underside of said concave surface;

detecting a position and a displacement of a non-transparent rollable object on said concave surface;

determining the frequency and amplitude of cyclical movement of said rolling object responsive to said position and said displacement on said concave surface; and determining primary waves of an earthquake by detecting an association of said frequency and amplitude with known frequency and amplitude that characterizes primary waves of an earthquake;

wherein said detecting is responsive to said rollable object blocking a portion of said illuminating of said concave surface.

* * * * *